(12) United States Patent
Cox (10) Patent No.: US 9,394,015 B2
(45) Date of Patent: Jul. 19, 2016

(54) CONTINUOUS TRACK SYSTEM

(71) Applicant: Andrew Cox, Slimbridge (GB)

(72) Inventor: Andrew Cox, Slimbridge (GB)

(*) Notice: Subject to any disclaimer, the term of this patent is extended or adjusted under 35 U.S.C. 154(b) by 0 days.

(21) Appl. No.: 14/541,108

(22) Filed: Nov. 13, 2014

(65) Prior Publication Data

US 2015/0129329 A1    May 14, 2015

(30) Foreign Application Priority Data

Nov. 14, 2013    (GB) .................................. 1320092.8

(51) Int. Cl.
*B62D 55/30*    (2006.01)
*B62D 55/084*    (2006.01)
*B62D 55/10*    (2006.01)

(52) U.S. Cl.
CPC .............. *B62D 55/084* (2013.01); *B62D 55/10* (2013.01); *B62D 55/30* (2013.01); *B62D 55/305* (2013.01)

(58) Field of Classification Search
CPC .... B62D 55/084; B62D 55/30; B62D 55/305; B62D 55/10
USPC ................................................. 180/9.62, 9.46
See application file for complete search history.

(56) References Cited

U.S. PATENT DOCUMENTS

| | | | | |
|---|---|---|---|---|
| 3,980,351 A * | 9/1976 | Orr | ........................ | B62D 55/30 305/146 |
| 4,874,052 A | 10/1989 | Purcell | | |
| 5,031,973 A | 7/1991 | Gillet | | |
| 5,316,381 A * | 5/1994 | Isaacson | .............. | B62D 55/305 305/145 |
| 5,372,212 A | 12/1994 | Davis | | |
| 5,390,996 A | 2/1995 | Bliss | | |
| 5,984,436 A * | 11/1999 | Hall | ........................ | B62D 55/30 305/143 |
| 6,336,690 B2 * | 1/2002 | Toms | ........................... | 305/144 |
| 7,644,788 B2 * | 1/2010 | Scheetz | ................ | B62D 55/112 180/9.5 |
| 7,870,914 B2 * | 1/2011 | Todd | ..................... | B62D 55/04 180/185 |
| 8,430,188 B2 * | 4/2013 | Hansen | .................. | B62D 55/04 180/9.26 |

(Continued)

FOREIGN PATENT DOCUMENTS

| | | |
|---|---|---|
| DE | 4423364 | 2/1995 |
| DE | 102010040739 | 3/2012 |

(Continued)

OTHER PUBLICATIONS

IPO Search Report, dated Jun. 11, 2014.

(Continued)

*Primary Examiner* — Kevin Hurley
*Assistant Examiner* — Marlon Arce
(74) *Attorney, Agent, or Firm* — Crose Law LLC; Bradley D. Crose (57) ABSTRACT

Continuously tracked vehicles such as tippers and bulldozers endure stresses and strains and it is desirable to reduce these stresses to extend their efficiency and life. A continuous track system is provided, comprising: a support structure supporting at least one jockey wheel and at least two tensioner wheels for supporting a track; two tensioners, one end of each tensioner being pivotably connected to the support structure, the two tensioner wheels being rotatably connected to an opposite end, for inducing tension in the track, wherein an axle of each tensioner wheel is pivotably connected by a link member to an axle of an adjacent jockey wheel; a controller for controlling the tensioners, wherein the controller maintains tension in the track by controlling the tensioners; a drive sprocket for rotation of the track; and a slew ring for attaching the support structure to a chassis of the vehicle.

14 Claims, 10 Drawing Sheets

(56) References Cited

U.S. PATENT DOCUMENTS

| | | |
|---|---|---|
| 2003/0047367 A1 | 3/2003 | Vaile |
| 2004/0244231 A1 | 12/2004 | Kubo et al. |
| 2005/0061557 A1 | 3/2005 | Brazier |
| 2005/0173984 A1 | 8/2005 | Christianson |
| 2010/0237574 A1 | 9/2010 | Allaire |
| 2011/0036650 A1 | 2/2011 | Simula et al. |

FOREIGN PATENT DOCUMENTS

| | | |
|---|---|---|
| EP | 1982904 | 10/2008 |
| FR | 2416825 | 2/1979 |
| GB | 1220374 | 1/1971 |
| GB | 2277307 | 10/1994 |
| GB | 2393696 | 4/2004 |
| JP | 61 191982 | 11/1986 |
| JP | 9240526 | 9/1997 |
| SU | 1350078 | 6/1986 |

OTHER PUBLICATIONS

IPO Search Report, dated Mar. 28, 2008.
IPO Exam Report, dated Jun. 27, 2011.
PCT Preliminary Report on Patentability, dated Dec. 3, 2009.
EPO Exam Report, dated Aug. 16, 2010.

* cited by examiner

CONTINUOUS TRACK SYSTEM

CROSS-REFERENCE TO RELATED APPLICATION(S)

This present non-provisional patent application claims priority to continuation of copending U.K. Patent Application No. GB1320092.8, filed on Nov. 14, 2013, and entitled, "A SUPPORT STRUCTURE" and of which the application cited above is incorporated in-full by reference herein.

FIELD OF THE INVENTION

The present invention relates to a continuous track system for tracked vehicles.

BACKGROUND OF THE INVENTION

Continuous tracks have been known for many years. They are extremely useful in situations where the ground is uneven and/or soft. The purpose of a continuous track is to spread the weight of the vehicle over a large surface area. This reduces the pressure exerted on the ground to a fraction of what the equivalent pressure would be if the vehicle had tyres instead of tracks. By reducing the pressure exerted on the ground the vehicle is less likely to become immobilised by poor ground conditions. As a consequence of this, the types of vehicles fitted with continuous tracks are often found on construction sites, mines, forests and other such areas where hard-surfaced, such as "metalled", constructed roads are not present.

Continuous tracks are traditionally made up of several track segments connected together to allow, at least partial, relative movement therebetween. Alternatively, continuous tracks are known which are made from a continuous length of flexible material such as heavy-duty plastics and/or rubbers. These tracks may include gripping formations on their outer surface (these are sometimes known as "grousers" in the industry). These gripping formations may be chevron in shape, or be a series of ribs running perpendicular to the length of the track. Other patterns and shapes are also possible.

The tracks typically include engagement members on their inner surface for engaging with at least one drive wheel or sprocket. The continuous track runs partially around at least two wheels, at least one of which is a drive sprocket. Typically, for heavy-duty plant such as bulldozers or tippers, the track runs around three principal wheels such that the track forms an approximate triangular shape when viewed from the side. In this formation, the drive sprocket is typically upper most with the two lower wheels serving to define the shape but not necessarily being driven to drive the track. These vehicles are often referred to as "high-drives".

It is also typical to have idler or jockey wheels associated with the continuous track. These help prevent the track from being pushed inwardly by uneven ground. In other words, they help to maintain the shape of the continuous track, especially along the lower, ground contacting, portion of the continuous track. Idler wheels may also be used at other points around the perimeter of the continuous track to maintain its shape for various reasons which will be discussed below.

Figure 1:
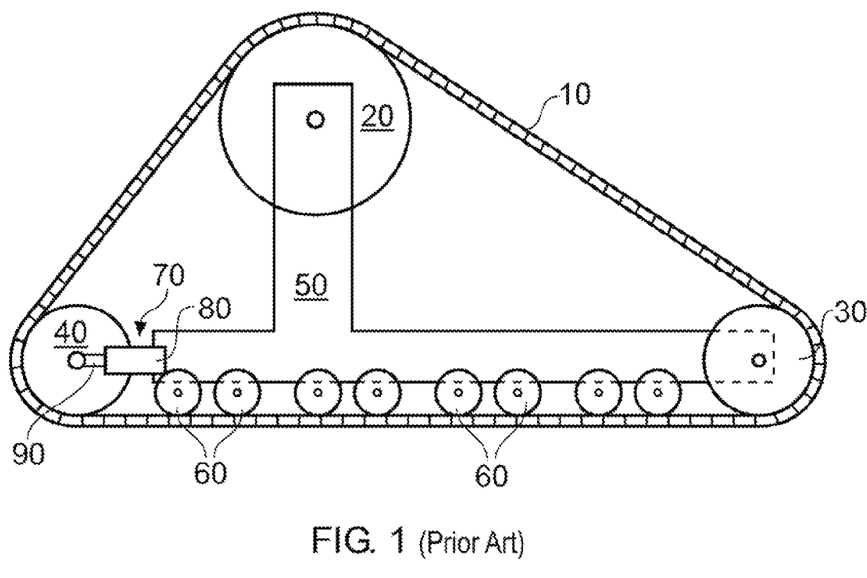
FIG. 1 is a side view of a known continuous track and tensioning system.

With reference to FIG. 1, which depicts a known continuous track system 70, the continuous track 10 is held in an approximate triangular shape when viewed from the side by three wheels 20, 30, 40. The upper wheel 20 is the drive sprocket which drives the continuous track around the three wheels 20, 30, 40. The wheels 30, 40 are not driven in this case but merely act to maintain the shape of the overall continuous track 10. The three wheels 20, 30, 40 are maintained in approximate position to one another by means of sub-structure 50 which in this case is appropriately shaped steel work which maintains the centre points of each of the three wheels 20, 30, 40 relative to one another. The three wheels 20, 30, 40 all rotate about their centre points.

Idler or jockey wheels 60 are shown situated between the lower wheels 30, 40. These wheels 60 typically are provided in pairs. They help to maintain the track at the lower portion between lower wheels 30, 40 in contact with the ground.

For effective use and to prolong the life of the continuous track and its associated structure it is known that the tension in the track must be managed. In other words, a track with a reasonable degree of tension within it is better than one which is too slack. This is because a slack track increases the likelihood of slippage between the track and the drive sprocket. By contrast, a track which has too much tension in it is also undesirable since it can increase wear on the system and is inefficient in that there is more friction in the system which has to be overcome by the drive sprocket. With regard to the former undesirable position, namely too much slack in the track, it is known that continuous tracks may elongate over time due to wear. Accordingly, it is known to manage the tension in continuous tracks by the provision of a tensioner. Such tensioners may take the form of a spring urging one of the wheels away from the others. Other forms of tensioners are known such as hydraulic rams made up of a barrel, or cylinder, and a piston or piston rod. Such prior track tensioning systems are known from GB-A-2393696, JP-A-09240526, U.S. Pat. No. 4,874,052, EP2150458A and JP-A-61191982.

In FIG. 1 the axis about which wheel 40 may rotate is not fixed relative to the structure 50 about which wheels 20 and 30 rotate. Rather, its axis is linked via a tensioner 70 comprising a barrel 80 and a piston 90. By this arrangement, and by careful control of the hydraulic fluid within the barrel 80, the relative position of the axle for wheel 40 relative to the structure 50 may be adjusted so that in turn the tension within the track 10 is adjusted. This is because the piston may be extended or retracted relative to the barrel 80. In this way, the tension in the track may be increased or decreased as appropriate. However, it is typical for these tensioners to be set at a predetermined setting and for the settings to be only manually changed as and when necessary, for instance at times of servicing.

A disadvantage of the known system is that if an external force is applied to the continuous track 10 in the region of the tensioned wheel 40 the tensioner 70 may be overcome such that the piston 90 is pushed back in towards the barrel 80 thus making the track slack. In such circumstances it is known for the track 10 to become disengaged with either or both the drive sprocket 20 and forward guide wheel 30. Even when the external force is removed, the track may not re-engage with the wheels 20, 30 such that the vehicle is substantially immobilised until the track has been repositioned correctly. An example of an external force could be provided by the vehicle approaching an object on the ground surface such a rock.

Such tracked vehicles have a structure for supporting the tracks, the idler and jockey wheels. It is usually important to allow this structure to pivot relative to the vehicle body to allow for better maneuverability and to cope with uneven ground conditions. This structure is typically pivotably attached to the drive axle of the vehicle. This introduces stresses and strain on the axle which leads to premature wear and possible failure.

Accordingly, it is desirable to have an alternative continuous track system which provides a way of supporting it to reduce the stress and strain on the vehicle's drive axle and to maintain tension in the track.

BRIEF SUMMARY OF THE INVENTION

In a first aspect, the invention provides a continuous track system for tracked vehicles, the system comprising:

a support structure supporting at least one jockey wheel and at least two substantially freely rotatable tensioner wheels for supporting a continuous track;

at least two tensioners, one end of each tensioner being pivotably connected to the support structure, the at least two tensioner wheels being rotatably connected to an opposite end of each tensioner for applying a force to the track to induce tension therein, wherein an axle of each tensioner wheel is pivotably connected by a link member to an axle of an adjacent jockey wheel;

a controller for adjustably controlling the at least two tensioners, wherein if the force applied by at least one of the tensioners is overcome by a force external to the system the controller maintains the tension in the track by controlling at least one other of the tensioners;

a drive sprocket for rotation of the continuous track; and a slew ring for attaching the support structure to a chassis of the vehicle, the slew ring including an aperture for receiving a drive axle of the vehicle, the drive axle for rotating the drive sprocket.

In this way, the continuous track may have tension induced within it at two or more points around the perimeter of the track. These two points are preferably located at separate places around the perimeter of the track. Accordingly, if a force external to the track presses against the track at one of the points at which tension is induced in the track the tensioner may be overcome. However, since the other tensioner may apply tension to the track at a point removed from the tensioner in contact with the external force it will still be able to provide tension in the track and indeed will be able to compensate for the lack of tension being provided by the tensioner in contact with the external force.

Furthermore, all of the weight of the vehicle is carried by the support structure because the support structure is attached to the chassis by means of the slew rings, and the chassis is elevated above the ground on which it travels. In a similar manner, all of the weight of the vehicle is carried by the slew rings. In other words, the support structure or slew rings may be said to support the weight of the vehicle. The drive axle and drive sprocket merely provide the torque to rotate the track.

This combination of slew ring and tensioners provides an improved continuous track system.

At least one of the at least two tensioners may be arranged to be able to apply force to the track in a direction substantially downwards (towards the surface on which the vehicle may travel). In other words, the tensioners may be arranged to apply force in a direction even slightly towards an imaginary plane parallel with the base of the triangular shape of the track. More preferably, the tensioners are able to apply force onto the inside of the track wherein the direction of the force has an angle to the imaginary horizontal plane passing through the length of track in contact with the ground surface which lies in the range of 45° plus or minus 20°. In one embodiment, the force may be directed perpendicularly downwards towards the imaginary horizontal plane/ground surface.

In one embodiment, there are only two tensioners.

The link member may have a predetermined length.

The tensioners may be provided in the form of hydraulic or pneumatic cylinders and pistons (rams). Alternatively, or additionally, the tensioners may be provided in the form of electromagnetic solenoids, cams, or actuators which may be displaced towards and away from the insides of the track by means of rotational movement. Other forms are of course possible and are contemplated herein.

If the tensioners are provided in the form of hydraulic or pneumatic cylinders and pistons then the system may comprise a fluid supply for supplying each tensioner. The fluid supply for each tensioner may be interconnected. In one embodiment, the controller may be the inter-connected fluid supply. In other words, the controller may be pipes which allow pressurised fluid to flow from one tensioner to the other.

The controller may comprise valves, solenoids, relays, switches, a CPU, and/or other types of typical control hardware and/or software. The controller may control each tensioner independently.

The phrase "jockey wheel" should be understood to mean an object which may guide and/or support a continuous track so as to maintain its shape. Typically, they are wheels but the phrase also encompasses the possibility of suitably shaped objects over which the track may slide. In this form the "wheels" may not rotate but may pivot.

In one embodiment, more than one tensioner wheel may be freely and rotatably connected to each tensioner. For example, two tensioner wheels may be connected with which to apply force to the track, and in another embodiment there may be four tensioner wheels for providing tension in the track. In these cases the tensioner wheels may be arranged substantially adjacent one another and may have coincident centres so that the wheels lie across the width of the track.

The tension induced in the track may be adjustable. The adjustability of the tension may be controlled by the controller.

If each of the tensioners is provided in the form of hydraulic or pneumatic pistons and cylinders then they may be interconnected in such a way that when one piston is displaced relative to its barrel the other piston is displaced relative to its barrel in a proportional manner. For instance, if both pistons are at rest projecting approximately 50% of their length out of their respective barrels and a force is applied to one piston such that it is moved in towards its barrel by 25% of the length of the piston then the other piston may be moved out of its respective barrel by 25% of its length. This assumes that both barrels and pistons have the same dimensions. If the respective barrels and pistons have different dimensions then the displacement of one will only induce proportional displacement in the other.

The interconnection between the two tensioners may be direct or may be made via the controller. If they are made via the controller then the controller may, in one embodiment, allow direct connection between the two tensioners but, in another embodiment may intervene such that the displacement in one tensioner does not automatically result in proportionate displacement in the other tensioner. Nonetheless, a basic embodiment of the invention does allow direct connection between the two tensioners such that displacement in one results in displacement in the other tensioner. This provides a simple and economic means of maintaining tension in the track at all times.

When the track is first fitted to the system the tensioners may be adjusted so as to provide a pre-defined tension within the track. This may be affected by introducing fluid into the system to a particular pressure level.

In one embodiment the system may comprise a sensitivity mechanism for adjusting the sensitivity of the tensioners to external forces. This sensitivity mechanism may be controlled by, or may be, the controller.

This means that it may be possible to increase the stiffness of each of the tensioner independently from one another. By increasing the stiffness, the magnitude of the force which must be applied to the tensioner in order to overcome its resistance to movement, which may be provided by the hydraulic or pneumatic fluid in the system or the electrical current in the system, may be increased or decreased or adjusted as necessary. This may allow the tensioner to act as a suspension member.

The system may further comprise a safety valve for relieving pressure above a threshold value in the fluid supply. A safety valve having a typical construction and well known in the field could be used for this. The safety valve may be necessary in situations where a sharp impact to one of the tensioners increases the pressure within the fluid supply above a safe threshold value. This may also occur with the ingress of foreign objects inside the track (for example, between the track and tensioner and/or jockey wheels). The safety valve may then relieve the excess pressure. Furthermore, the safety valve may guard against undue pressure in the supply due to a failure in the controller and/or the hydraulic/pneumatic supply power pack.

If the tensioners are hydraulic or pneumatic then a source of pressurised fluid is required. Typically heavy duty plant already have so-called "power packs" which provide pressurised fluid for the operation of hydraulic or pneumatic rams for the operation of tools such as rippers, blades, buckets, arms etc. Accordingly, in such cases it is relatively easy to use the existing power pack to also provide the pressurised fluid for the tensioners necessary for the operation of the tensioning system. However, if the vehicle to which the tensioning system is to be used does not already have its own power pack then an independent power pack may be provided as part of this system, or as part of the vehicle, for providing the necessary pressurised fluid.

It is contemplated that the tensioner system and associated continuous track and track assembly may be fitted to either side of a vehicle. In this case, it is possible that the tensioners on either side of the vehicle are interconnected. This may allow automatic or controlled management of both tensioners in response to ground conditions and/or other such external factors. For instance, this interconnection may be used to aid damping of any vibration induced in the vehicle and/or track assemblies.

In one embodiment, the tensioners are, and/or act as, shock absorbers.

The term "slew ring" may mean a bearing including at least one rotational rolling-element bearing, often including two rows of rolling elements. These often use three race elements, such as an inner ring and two outer ring "halves" that clamp together. Slew rings are typically used to support relatively heavy but slow-turning objects or machinery such as cranes.

Compared to other rolling-element bearings, slew rings are comparably thin in section.

The support structure may include an attachment member unitary with the slew ring. For instance there may be holes through which bolts may be placed. In this case, the slew ring may be said to be directly attached to the chassis of the vehicle. However, the attachment member may be affixed to the slew ring and positionable, in use, between the slew ring and the chassis of the vehicle. In this case, the attachment member may be a separate, yet attachable, element as described below. For instance, the attachment member may comprise a plate with an aperture therethrough for receiving the drive axle of the vehicle.

The slew ring is not supported by the drive axle of the vehicle.

The slew ring may be configured to allow 360 degree rotation of the support structure relative to the chassis of the vehicle. However, the support structure may further comprise rotation limiters for limiting the angle through which the support structure may rotate relative to the chassis of the vehicle/about the drive sprocket. For instance, the rotation limiters may limit the rotation of the support structure relative to the chassis of the vehicle to 20 degrees, more preferably 10-15 degrees, in either direction. The limiters may comprise bars attached to the support structure which extend underneath the chassis of the vehicle such that in use they may move a certain amount but are prevented from moving too much by the chassis.

The rotation limiting device may be connected, in use, at one end to the body of the vehicle and at the other end to the support structure. For instance, the rotation limiters may be straps attached from the support structure to the chassis of the vehicle.

The support structure may further comprise a first plate attached to one side of the slew ring, the plate being attachable in use to the chassis of the vehicle, the first plate extending radially in a first plane parallel to the plane of the circumference of the slew ring.

The slew ring may be oriented such that the first plane is substantially vertical in use, such that rotation of the slew ring relative to the chassis of the vehicle occurs in a vertical plane.

The support structure may further comprise at least one second plate unitary with, and extending away from, the first plate in a second plane perpendicular to the first plane.

The at least one second plate may be curved having a centre of radius position approximately equal to the position of the centre of radius of the drive axle of the vehicle, in use.

The continuous track system may be initially separate from the vehicle such that the system is pre-assembled ready for fitting, or retro-fitting, onto a vehicle.

In one embodiment, the drive axle may be used for turning tired wheels for movement of the vehicle such that the vehicle is converted to track usage by removing the tired wheels and attaching the drive sprocket of the system to the drive axle.

In one embodiment, the system may be in a high drive configuration. This may be similar to, or the same as, the arrangement shown in FIG. 1 discussed above. The term "high drive" is well known to the skilled person and means a system which is approximately triangular in shape when viewed from the side of the vehicle whereby the drive sprocket is located at the vertex of the triangle so that it is as far away as possible from sources of contamination or foreign material which might cause damage. Two other wheels or guides are located at the lower corners of the triangle. Accordingly, in one embodiment, the system may include wheels for maintaining the shape of the track, in a plane substantially parallel to a length of the track and oriented substantially vertically in use, in a substantially triangular shape. The wheels maintain each corner of the substantially triangular shape. The drive sprocket may be located substantially equidistant between the wheels at each lower corner of the substantially triangular shape. The wheel at each lower corner of the substantially triangular shape may be a tensioner wheel.

Even if not in a high drive configuration it may be preferable to locate one of the tensioner wheels at each of the two lower corners of the track (when viewed from the side). For example, if the track is triangular in shape or trapezoidal in shape it will have two corners adjacent the surface on which the vehicle travels. Having the tensioner wheels located in these positions may provide a certain amount of shock absorbency to the track as these will be the points at which it may contact objects in or on the surface which may otherwise cause damage to the system.

The controller may be used to increase the tension in, and/or the shape of, the continuous track which may be useful at certain times. For instance, a tipper is more stable if the area of the tracks which are in contact with the ground surface is as large as possible. Additionally or alternatively, during tipping, a tipper is more stable if its centre of gravity is located underneath, or as close as possible to being underneath, the point at which the load rotates during tipping. Accordingly, by adjusting the contact area between the continuous track and the ground the centre of gravity of the tipper may be affected. This may be achieved not only by increasing the surface area of the tracks in contact with the ground but also by moving the area which is in contact towards the point at which the load is rotated about during tipping. In other words, by extending the tensioners towards the front of the vehicle (if it is the front of the vehicle from where the load is tipped) or towards the rear of the vehicle (if it is the rear of the vehicle from where the load is tipped) the area of the tracks in contact with the ground will be closer to being directly underneath the tipping point. This will also provide a greater reactive force resisting the inherent overturning moment induced in the system due to the act of tipping.

When a tracked vehicle fitted with the system needs to pass over an object on an otherwise relatively planar surface (for instance a log lying across a road) the front tensioners may be pressed inwards, by the object, towards the rear of the vehicle and the rear tensioners may compensate for the induced slack in the track by extending further outwardly from the vehicle, as described above. However, it has been surprisingly found that by altering the shape of the overall perimeter of the continuous track in this way the vehicle may be lifted at its front end so that it more easily climbs up and over the obstacle.

When a vehicle fitted with continuous tracks travels in one direction it is known that the forces induced in the track by the drive sprocket and the contact with the surface over which it travels, may change the shape of the overall continuous track. For instance, when the vehicle is travelling, the tensioners located towards the rear of the track will be pulled upwards and inwards by the force of the drive sprocket pulling the track "upwards". The front tensioners will compensate for the slack induced in the track by the movement of the rear tensioners by being displaced away and outwardly from the centre of the track system. The greater the torque applied by the drive sprocket the greater the pull on the track and consequently the further the rear tensioners will move upwardly and inwardly and the further the front tensioners will move downwardly and outwardly.

The system may, in one embodiment, be symmetrically in use about a vertical axis so that a vehicle having a system installed on both sides is symmetrical about a vertical plane passing through the length of the vehicle parallel to the length of the tracks. This allows for a system to be fitted to the right or left side of a vehicle. In other words there may be no "right" and "left" systems, there may only be one system which may be fitted to either side.

The symmetry of the system may be about a vertical plane passing through the system transverse to the length of the track and through the centre of the drive wheel.

The system may have a bi-directional configuration such that it may be used to move a vehicle easily in either direction.

In a second aspect, the invention provides a tracked vehicle comprising the continuous track system according to the first aspect.

The tracked vehicle may include a drive axle for driving the drive sprocket, and may include a continuous track for being driven by the drive sprocket.

In a third aspect, the invention provides an articulated tracked vehicle including an articulation joint, comprising at least four continuous track systems according to the first aspect, wherein two systems are located on one side of the articulation joint, and two systems are located on the other side of the articulation joint.

One part of the vehicle on one side of the joint may have means for carrying a tippable load. For instance the vehicle may be a site dumper having two articulated parts. One part may have a tippable skip for carrying a load and the other part may include the engine and power pack and carry the driver. Both, or either, of the two parts may have systems according to the first aspect, having any combination of the features described above, on both sides.

The tensioner and/or jockey/idler wheels may comprise plastics. They may be made of plastics. The tensioner wheels may be larger in diameter than the jockey/idler wheels.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION OF THE INVENTION

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

FIG. 1 is described above.

Figure 2:
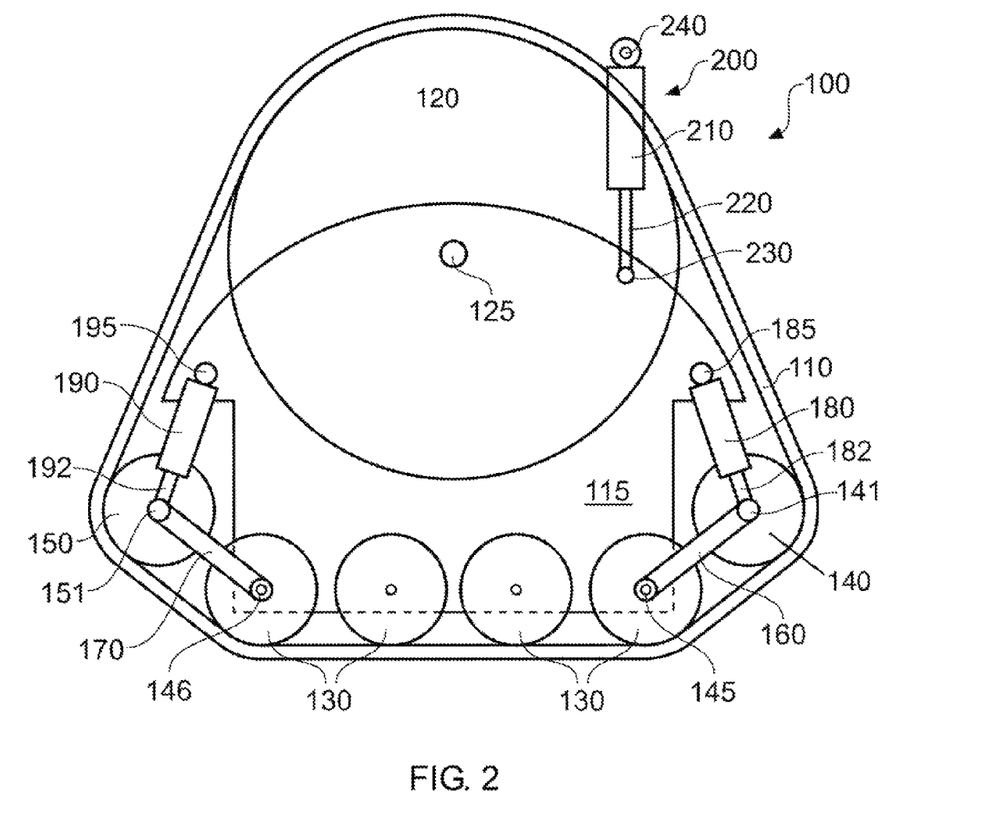
FIG. 2 is a side view of a continuous track tensioning system according to the first aspect of the invention in a first position.

In FIG. 2 the reference 100 refers to a continuous track tensioning system including a continuous track 110 and a drive wheel 120. A rotation limiting device 200 is also shown. The track 110 passes over and is engaged with at least some of the circumferential surfaces of the drive wheel or sprocket 120, idler, or jockey, wheels 130 and tension wheels 140, 150. The whole system 100 is attached to the drive shaft or axle 125 which is typically arranged on the side of a vehicle. Further, it is typical for one of these systems 100 to be provided on either side of the vehicle. In some cases, it is possible to have more than one of these systems 100 on either side of the vehicle.

The drive shaft 125 rotates thus rotating the drive wheel 120 and thus turning the track 110. The idler wheels 130 are fixed in position relative to the drive wheel 120 by means of support structure 115. This support structure may take the form of sheet steel or other suitable material. Its shape is for illustrative purposes only. Tension in the continuous track 110 is provided by tensioners. There are two tensioners shown in FIG. 2. The first tensioner is shown on the right and the second is shown on the left. The tensioners are provided between the idler wheels 130 and the drive wheel 120. In one embodiment, only one tensioner is provided at each end of the unit. In another embodiment more than one tensioner is provided at each end. The overall approximate shape of the continuous track 110 is triangular, when viewed from the side, with the tension wheels 140, 150 provided at each of the two lower corners of the triangle. Tension wheel 140 presses against the inside of the track 110. It is urged against the track by means of a barrel 180 and piston 182. The distal end of the piston 182 is connected to the axle 141 about which tension wheel 140 rotates. The distal end of the barrel 180 is fixed to the support structure 115 at point 185 about which it may rotate. The rotation of the tension wheel 140 about point 185 is limited by means of a link member 160 which connects the axle 141 of the tension wheel 140 with the axle 145 of the nearest jockey wheel 130. The same is repeated on the left hand side of the structure 100 in that there is a barrel 190 and an associated piston 192. The distal end of the barrel is pivoted at point 195 to the support structure 115. The distal end of the piston 192 is connected to the centre 151 of tension wheel 150 about which this jockey wheel rotates. The axle 151 is linked to the axle 146 of the nearest jockey wheel 130 by means of a link member 170. This link member limits the, and defines a predetermined radius of, rotation of the tension wheel 150 about point 146.

FIG. 2 also illustrates the rotation limiting device 200. This device 200 comprises a barrel 210 and a piston 220. The distal end of the piston 220 is connected to the support structure 115 at point 230. The distal end 240 of the barrel 210 is connected to the side of vehicle (not shown).

When a vehicle fitted with such a continuous track tensioning system 100 travels the rear tensioner will be pulled upwards and inwards relative to the surface over which the vehicle is travelling. This is due to the force of the drive means pulling the track upwardly as discussed above. The front tensioner will compensate for this by extending further outwards thus taking up any slack in the track. This situation is not shown in the attached drawings.

Figure 3:
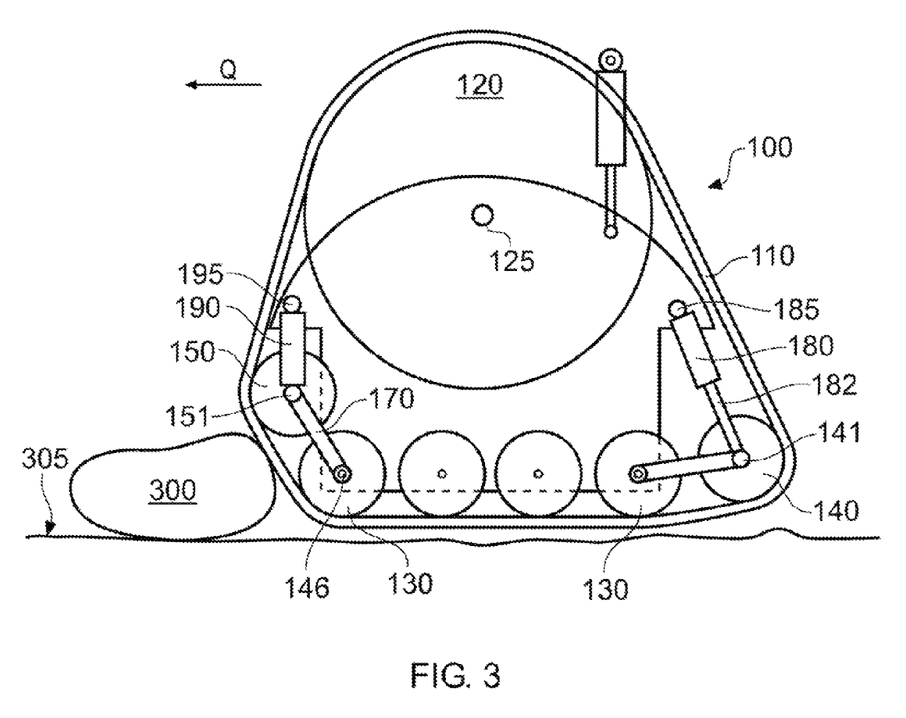
FIG. 3 is a side view of the track tensioning system of FIG. 2 in a second position.

In FIG. 3 the vehicle to which the system 100 is associated is travelling in the direction referenced "Q" (i.e. towards the left hand side of the drawing). The surface 305 on which the track 110 is running has an object 300 present on its surface. An example of such an object could be a rock. The leading edge of the system 100 has met with this object 300. This object 300 provides an external force onto the track 110 such that the left hand tensioner is moved. The piston 192 has been pushed inside the barrel 190 so that tensioner wheel 150 has rotated about fixed point 195.

To compensate for the slack induced in the track 110 by the front tensioner having moved, the rear tensioner has displaced the piston 182 relative to the barrel 180 such that tensioner wheel 140 has been moved outwardly relative to the axis 125 of the drive wheel 120. The tension within the continuous track has thus been maintained. The movement of the two tensioners may have been automatic in that the fluid system connecting the two tensioners is a closed system such that the movement of the piston 192 relative to the barrel 190 moves fluid through the system from the front tensioner to the rear tensioner so that the rear piston 182 is pushed outwardly relative to the barrel 180. Alternatively, or additionally, the movement of the two tensioners may also be partially or fully controlled by the controller (not shown).

With the front tensioner in the retracted position the vehicle will be able to begin "climbing over" the rock more easily. Additionally, or alternatively, to overcome the force being applied by the rock onto the track the torque in the drive sprocket 120 may be increased (automatically or under driver control). This increase in torque will pull the track upwardly at the rear of the system 100 thus retracting piston 182 into barrel 180. Accordingly, to compensate for the subsequent increase in slack in the track the front tensioner will extend outwardly pushing the front tension wheel 150 forwardly and/or downwardly. This action will lift the front of the vehicle over the rock 300 thus assisting in the vehicle's journey.

Once the vehicle has passed over the object 300 then it is expected that the tension wheels 140, 150 would return to their stable position as shown in FIG. 2 if the vehicle is stationary. However, as discussed above, it has been found that if the vehicle moves at a speed greater than a predetermined value the shape of the continuous track 110 will naturally assume a shape wherein the rear tensioner is retracted by comparison with the front tensioner. Alternatively, or additionally, it may be desired to employ the controller to affect the shape of the continuous track 110 to improve efficiency or to achieve a particularly desired result based on the ground conditions or use of the vehicle.

Figure 4:
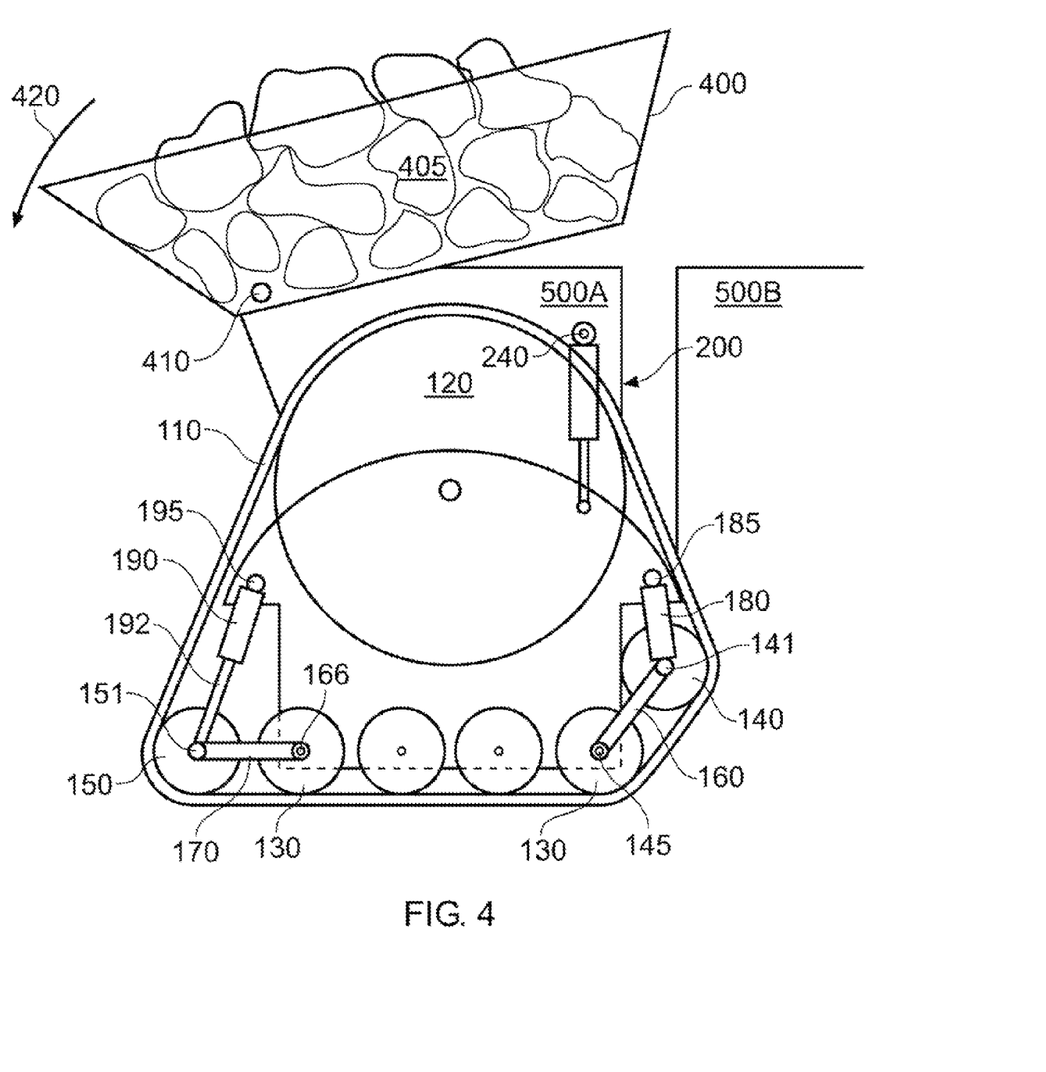
FIG. 4 is side view of the track tensioning system of FIG. 2 in a third position.

In FIG. 4, the front tensioner has been adjusted so that the area of the continuous track 110 which is in contact with the ground surface is located more towards the front of the vehicle than the rear of the vehicle. This is because in this example the vehicle which has a body 500A and 500B includes a tipping part 400, towards the front of the vehicle, which is carrying a load 405. The tipping part 400 may rotate about axis 410 in a direction 420. During the tipping manoeuvre, the centre of gravity of the load will move to the left as the bucket holding the load is tipped to the left, or front of the vehicle. Accordingly, by moving the area of the tracks 110 which is in contact with the ground surface and thus shifting the centre of gravity of the vehicle there is less likelihood that the vehicle will overturn during tipping operation. As well as moving the centre of gravity of the vehicle towards the front, the act of altering the shape of the track to move the area in contact with the ground also provides a greater reactive force resisting the overturning moment induced in the vehicle during tipping.

To compensate for the front tensioner being extended, the rear tensioner has retracted such that the tension wheel 140 has been lifted away from the ground and in towards the axis 125 of the drive wheel 120. This has been achieved by the piston 182 retracted inside the barrel 180. This operation may be affected by the controller. The tension in the track is therefore effectively maintained constant. However, it may be possible to simultaneously extend both tensioners outwardly to thus provide greater tension in the track and an even greater area of contact between the track and ground surface.

Although not shown, it is possible to have other tensioners located within the perimeter of the track which are typically extended in normal operation but which may be retracted as necessary so as to introduce greater slack into the track which may be taken up by the front and rear tensioners so as to provide the track with as great an area of contact with the ground as possible.

The rotation limiting device 200 is shown rotatably fixed at the upper part 240 to the vehicle body 500A.

The vehicle body 500A and 500B may be articulated such that body 500A is separated from body 500B by an articulation joint. Each body 500A, 500B may have systems 100 provided on each side.

Figure 5:
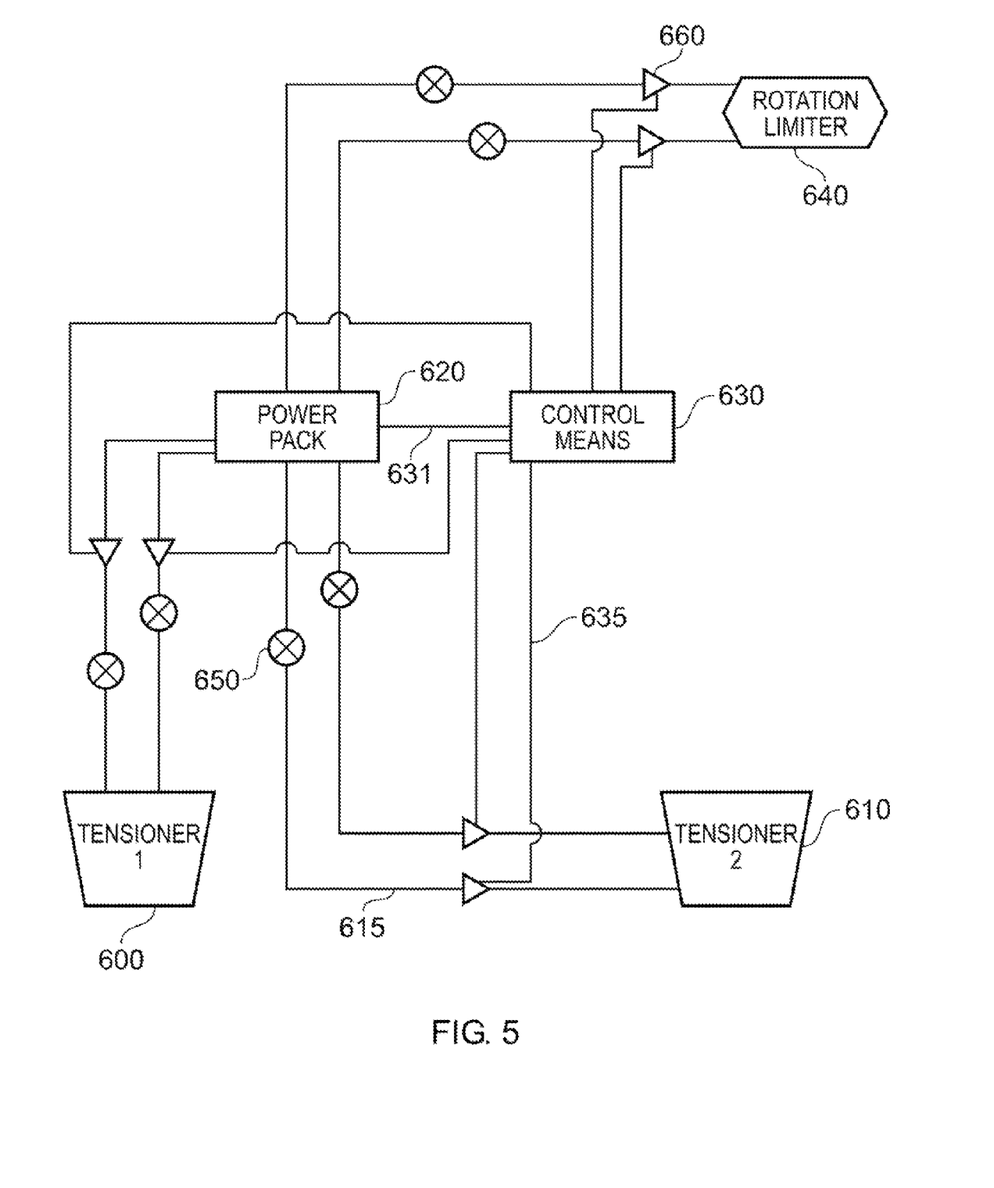
FIG. 5 is a diagram illustrating the means of connection and control of the elements of one embodiment of the invention.

In FIG. 5, the two tensioners 600, 610 are shown. They are connected by hydraulic lines, pipes or conduits 615, to the power pack 620. The power pack 620 is controlled by the controller 630 by means of control links 631. The rotation limiter 640 is also connected to the power pack by means of hydraulic lines or pipes. In each of the hydraulic lines safety valves 650 are provided. These prevent over pressure in the system from damaging any of the elements.

Each of the hydraulic lines 615 also includes a control valve 660. These control valves are 660 controlled by the controller 630 by means of control lines 635. The control valves 660 may regulate the supply of fluid through the supply lines 615 and thus from reaching or leaving any one, or all of the elements 600, 610, 640. This may "lock" the tensioners and rotation limiters in their current positions for greater stability of the vehicle.

The control lines 635 may be electronic, electrical, hydraulic, pneumatic, or wireless. The power pack 620 may already be part of the vehicle or may be additionally provided.

Figure 6:
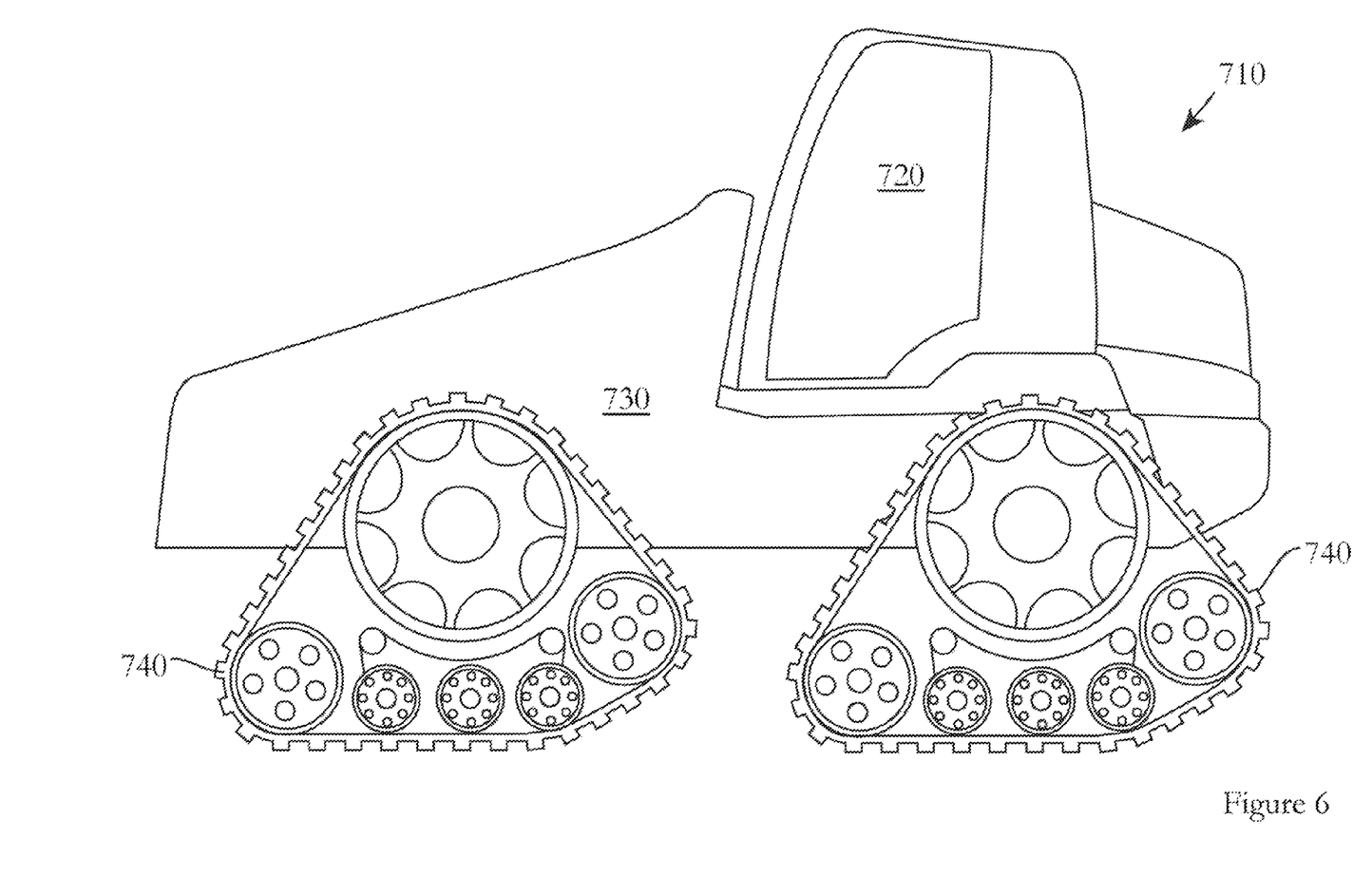
FIG. 6 is a side elevational view of a vehicle including continuous track units.

In FIG. 6 an elevational side view of another simplified tracked vehicle 710 is shown. The vehicle 710 comprises an operator cab 720, a vehicle body 730 and two continuous track units 740 provided on each side (only the ones on the facing side are shown). The continuous track units will be described in more detail below, however, a general arrangement is shown in FIG. 7.

Figure 7:
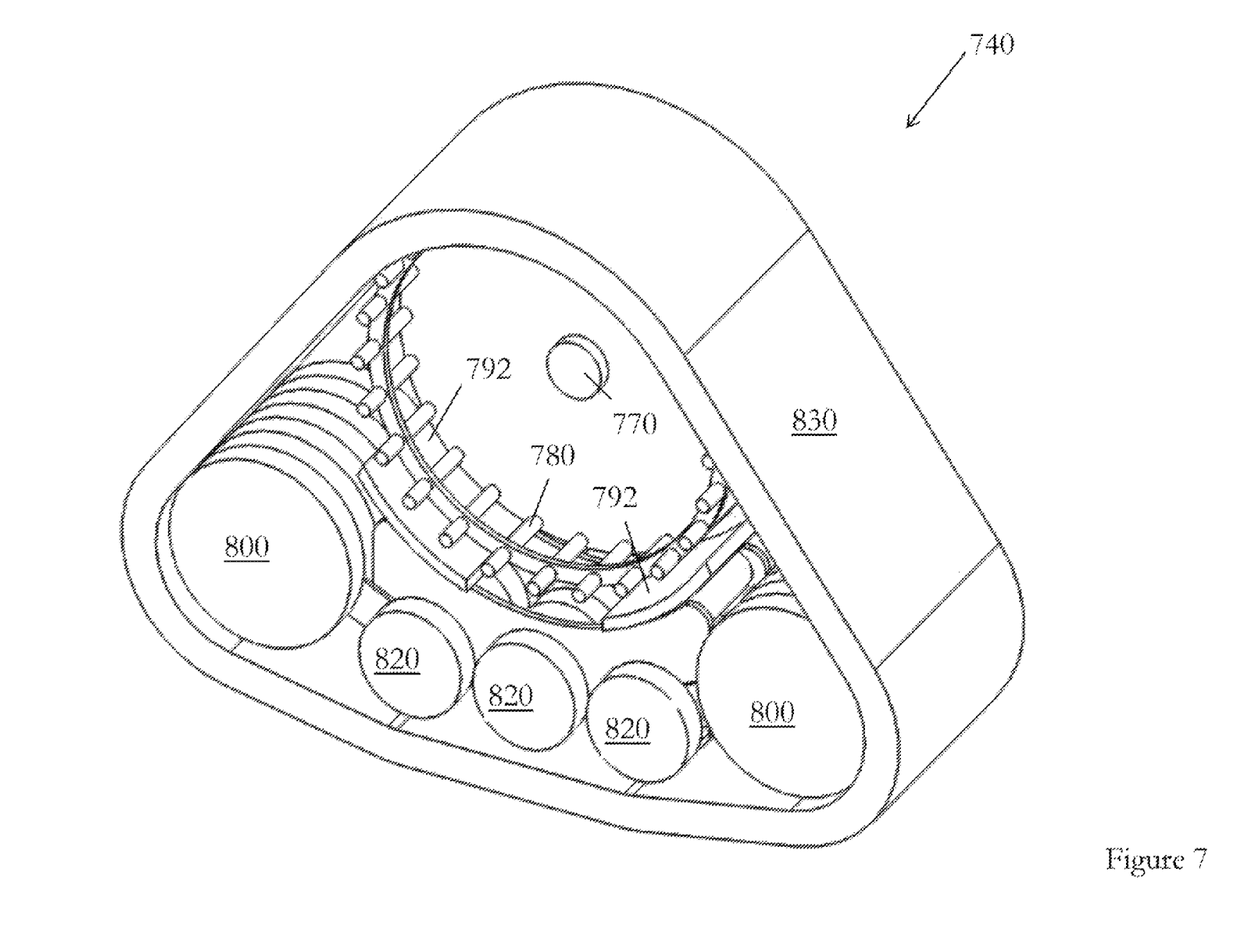
FIG. 7 is an elevational schematic view of part of a continuous track unit.

In FIG. 7, the unit 740 comprises a continuous track 830 extending around a drive sprocket 780, two jockey wheels 800 and three intermediate bottom rollers 820. The unit 740 is a high drive unit with the drive sprocket 780 provide towards the upper apex of the approximate triangular shape of the unit.

The drive sprocket 780 is mounted on, and rotated by, a drive bearing 770. The bottom rollers 820 are mounted on two parallel plates 810 located beneath the drive sprocket 780 and between the two jockey wheels 800. A jockey wheel 800 is located at each of the lower two apexes of the approximate triangular shape of the unit 740. There may be more than one jockey wheel 800 arranged in a row at each of the two lower apexes. There may be four at each apex. There may also be more than the three bottom rollers 820 shown. There may be three rows of bottom rollers 820, each row comprising four rollers. There may be more or less than three rows of bottom rollers 820.

The axles of the two outer most axial bottom rollers 820 in each of the rows nearest the jockey wheels 800 may be connected to the axles of the jockey wheels 800 by a linkage 805. This linkage may have a fixed length but allow the two connected axles to move relative to one another and to the unit 740 overall.

A support structure is partially shown in FIG. 7. It comprises two plates 792 each having an arcuate shape located between the plates 810 and the drive sprocket 780.

Each of the axles of the two rows of jockey wheels 800 may be connected to one of these plates 810 with a hydraulic ram (not shown). In this manner, the distance between each of the axles of the two rows of jockey wheels 800 and the support structure plates 792 may be variable to adjust the tension in the continuous track.

Figure 8:
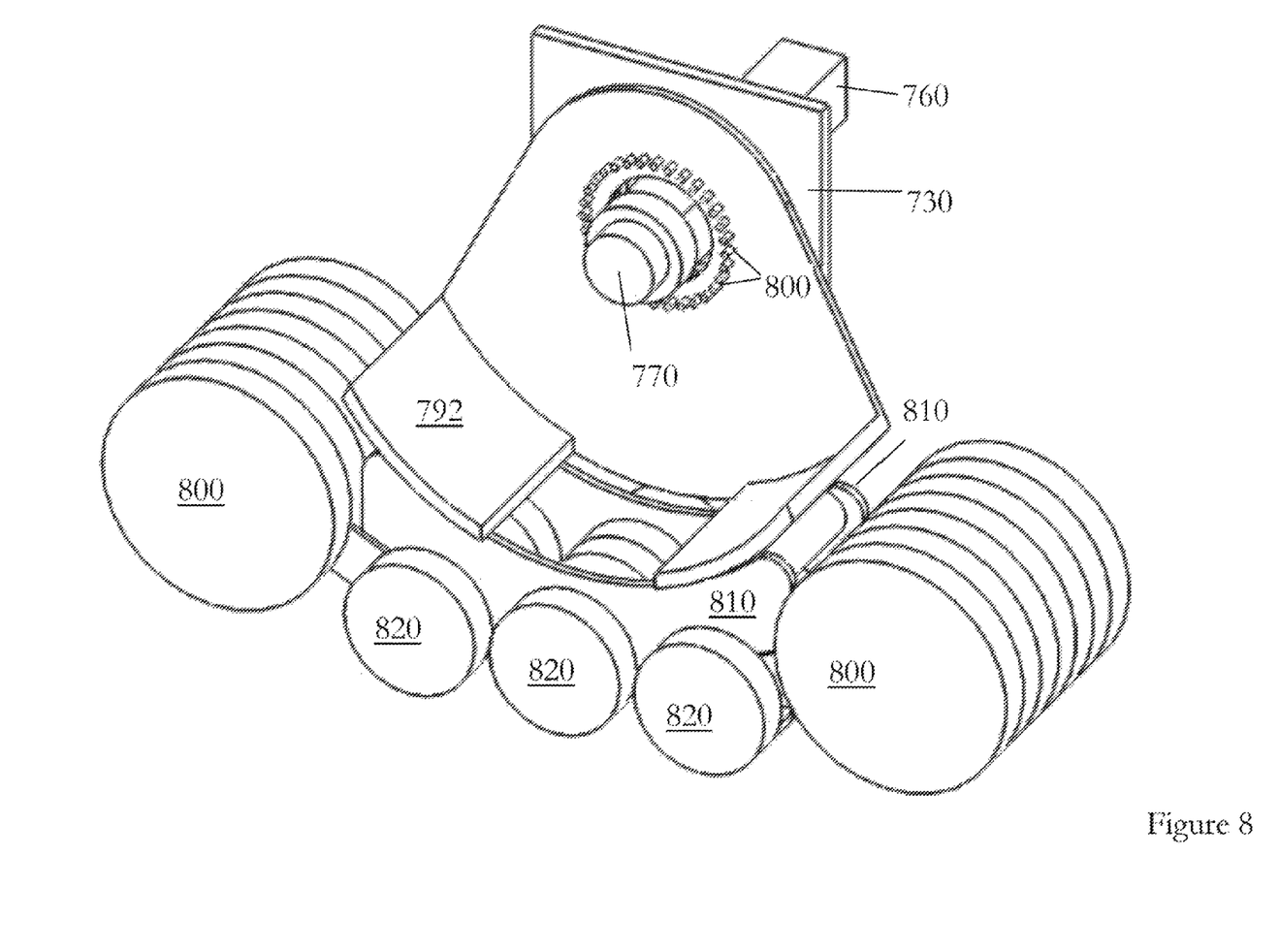
FIG. 8 is a perspective view of part of a continuous track unit without the drive sprocket.

The support structure is better understood from FIG. 8 in which the same view as FIG. 7 is shown but without the continuous track 830 and drive sprocket 780.

A back plate 790 is shown to which at the base the two plates 792 are connected. It is to be understood that the support structure may be a single piece of shaped metal (such as steel) or that it could comprise more than two pieces affixed to one another such as by welding or bolting.

In one possibility each of the two plates 792 are formed from curved steel and are then welded to the base of the back plate 790 such that there are only two lines of welds, one for each plate 792.

The support structure back plate 790 includes a hole through which the drive axle 760 of the vehicle (not shown) projects. The drive sprocket is attached to the drive axle 760 via drive bearing 770.

The back plate 790 is indirectly bolted to the body 730 of the vehicle (a portion only of which is shown) by the use of bolts 800, although other ways of connection are contemplated. In this regard, the term body 730 may also include the chassis of the vehicle.

The two plates 792 add strength to the support structure and may act to prevent stones and rocks from reaching the drive sprocket 780 in use.

Figure 9:
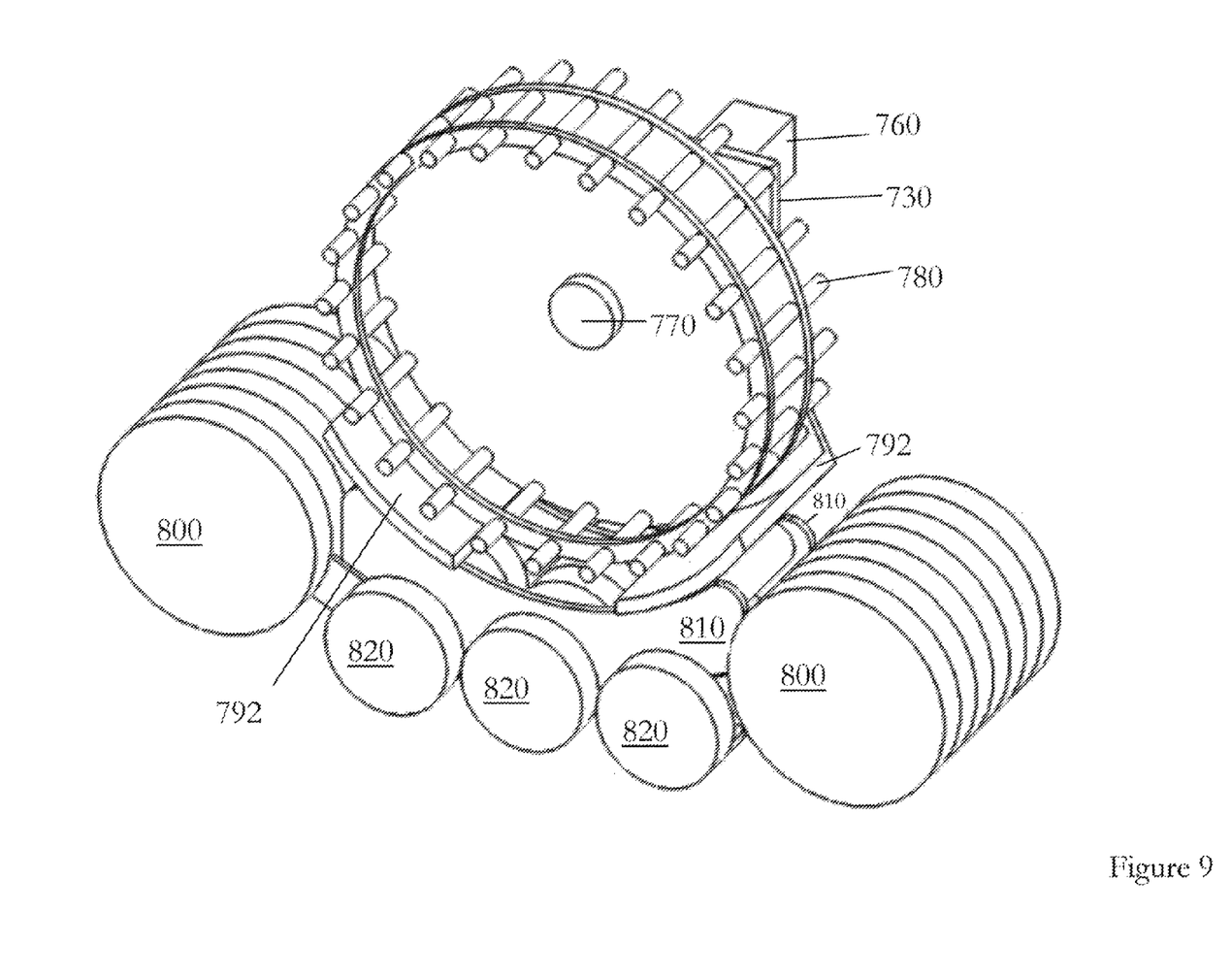
FIG. 9 is a perspective view of part of a continuous track unit including the drive sprocket.

FIG. 9 shows the unit from the same direction as FIGS. 7 and 8 but include the drive sprocket 780 but not the continuous track 830. The other referenced features in FIG. 4 are the same as has already been described with reference to FIGS. 7 and 8.

Figure 10:
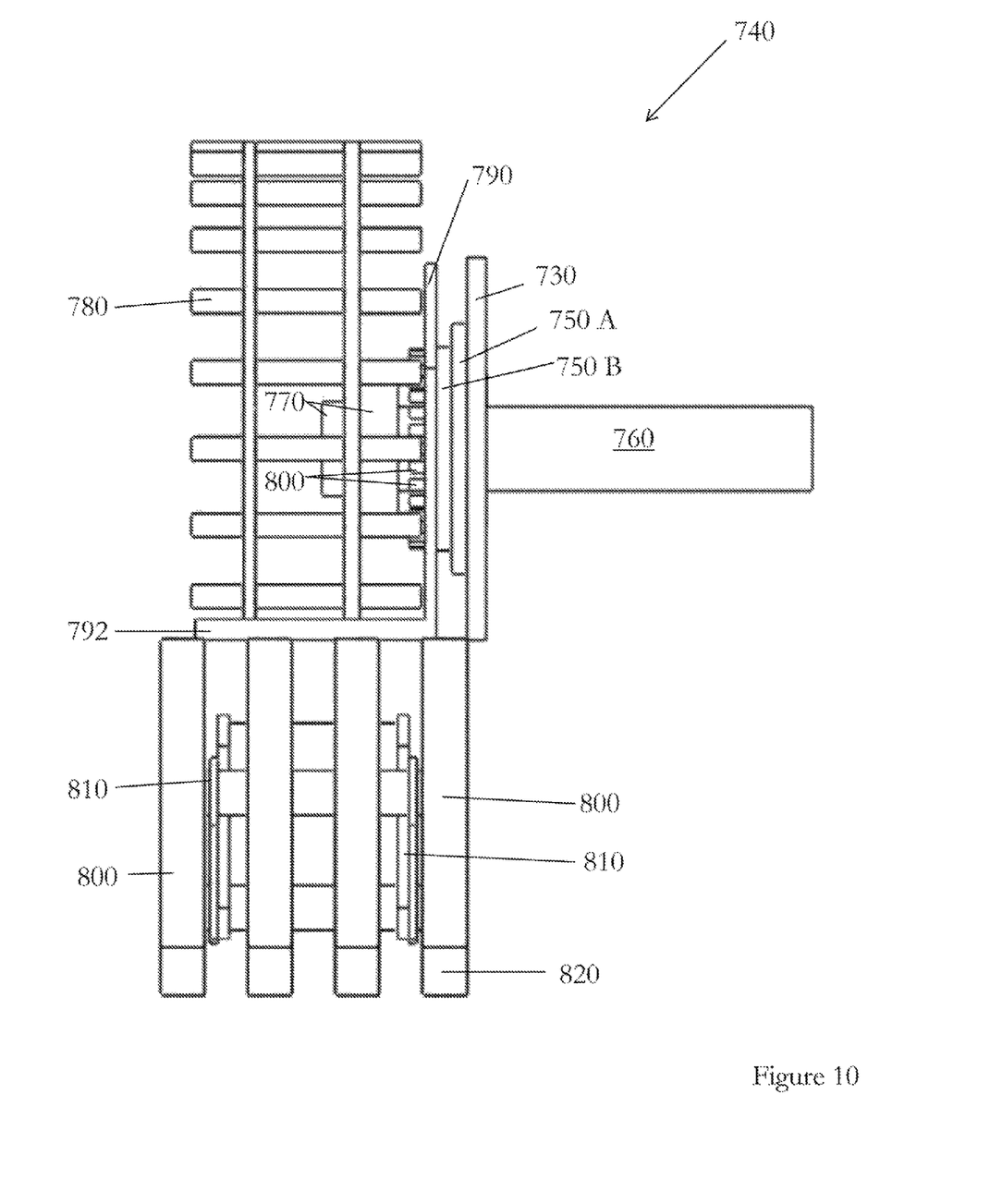
FIG. 10 is a perspective view of part of a continuous track unit including the continuous track.

In FIG. 10 the unit 740 is shown viewed in the direction of rotation of the drive sprocket 780.

The drive axle 760 of the vehicle (not shown) is visible to the right. The drive bearing 770 at its left hand end is shown together with the drive sprocket 780. The continuous track is omitted to improve the clarity.

Between the back plate 790 of the support structure and the chassis or vehicle body 730 a slew ring is arranged. This has a fixed outer ring 750A and a rotatable inner ring 750B. The outer ring 750A is bolted to the chassis 730. The inner ring 750B is bolted to the back plate 790. In one possibility (not shown), an intermediary plate is provided between the chassis 730 and the back plate 790. In this case, the outer fixed ring 750A would be affixed to this intermediary plate and the intermediary plate itself affixed to the chassis 730.

In the lower portion of FIG. 10 the four jockey wheels 800 are visible and the one row of four bottom rollers 820 is partially visible behind these jockey wheels 800. Furthermore, the two plates 810 to which the bottom rollers are affixed are visible. In this regard, the two plates 810 may comprise two bottom rollers 820 therebetween and one bottom roller on the axially outer side of each of the two plates 810, such that each plate 810 is sandwiched between two bottom rollers 820 on each of the three axles (corresponding to the three rows of bottom rollers 820).

In use the drive axle 760 drives the drive bearing 770 which in turn drives the drive sprocket 80 which thus rotates the continuous track 830 around the perimeter of the unit 740. The continuous track 830 is supported by the drive sprocket 830, the two jockey wheels 800 and the bottom rollers 820.

The unit 740 may pivot relative to the chassis or vehicle body 730 due to the slew ring 750A, 750B. The weight of the unit 740 is carried by the chassis or vehicle body 730 and not by the drive axle 760 or drive bearing 770.

Although not shown, it is possible to have other tensioners located within the perimeter of the continuous track 830 which are typically extended in normal operation but which may be retracted as necessary so as to introduce greater slack into the track which may be taken up by the front and rear jockey wheels 800 so as to provide the track with as great an area of contact with the ground as possible.

The vehicle body 730 may be articulated such that there are two bodies (not shown) separated but connected by an articulation joint. Each body may have units 740 provided on each side.

What is claimed is:

1. A continuous track system for tracked vehicles, the system comprising:
   a support structure supporting at least one jockey wheel and at least two substantially freely rotatable tensioner wheels for supporting a continuous track;
   at least two tensioners, one end of each tensioner being pivotably connected to the support structure, the at least two tensioner wheels being rotatably connected to an opposite end of each tensioner for applying a force to the track to induce tension therein, wherein an axle of each tensioner wheel is pivotably connected by a link member to an axle of an adjacent jockey wheel;
   a controller for adjustably controlling the at least two tensioners, wherein if the force applied by at least one of the tensioners is overcome by a force external to the system the controller maintains the tension in the track by controlling at least one other of the tensioners;

a drive sprocket for rotation of the continuous track;

a slew ring for attaching the support structure to a chassis of the vehicle, the slew ring including an aperture for receiving a drive axle of the vehicle, the drive axle for rotating the drive sprocket; and a first plate attached to one side of the slew ring, the plate being attachable in use to the chassis of the vehicle, the first plate extending radially in a first plane parallel to the plane of the circumference of the slew ring.

2. The system according to claim 1, including a rotation limiter for limiting the rotation of the support structure about the drive sprocket.

3. The system according to claim 2, wherein the rotation limiter is connected, in use, at one end to the body of the vehicle and at the other end to the support structure.

4. The system according to claim 1, wherein the support structure includes an attachment member unitary with the slew ring.

5. The system according to claim 1, wherein the support structure includes an attachment member affixed to the slew ring and positionable, in use, between the slew ring and the chassis of the vehicle.

6. The system according to claim 5, wherein the attachment member comprises a plate with an aperture therethrough for receiving the drive axle of the vehicle.

7. The system according to claim 1, wherein the slew ring is configured to allow 360 degree rotation of the support structure relative to the chassis of the vehicle.

8. The system according to claim 1, further comprising at least one second plate unitary with, and extending away from, the first plate in a second plane perpendicular to the first plane.

9. The system according to claim 8, wherein the at least one second plate is curved having a centre of radius position approximately equal to the position of the centre of radius of the drive axle of the vehicle, in use.

10. The system according to claim 1, wherein the tensioners are hydraulic rams.

11. The system according to claim 1, being pre-assembled and retro-fittable to existing vehicles.

12. A tracked vehicle comprising the continuous track system according to claim 1.

13. The tracked vehicle according to claim 12, including a drive axle for driving the drive sprocket, and including a continuous track for being driven by the drive sprocket.

14. An articulated tracked vehicle including an articulation joint, comprising at least four continuous track systems according to claim 1, wherein two systems are located on one side of the articulation joint, and two systems are located on the other side of the articulation joint.

* * * * *